United States Patent
Crawford (10) Patent No.: US 10,462,540 B2
(45) Date of Patent: Oct. 29, 2019

(54) INTELLIGENT SYSTEM FOR INTERCONNECTING DATA NETWORKING EQUIPMENT

(71) Applicant: BELDEN CANADA INC., Saint-Laurent (CA)

(72) Inventor: Dwayne Crawford, Pointe-Claire (CA)

(73) Assignee: BELDEN CANADA INC., Saint-Laurent (CA)

(*) Notice: Subject to any disclaimer, the term of this patent is extended or adjusted under 35 U.S.C. 154(b) by 0 days.

(21) Appl. No.: 16/109,165

(22) Filed: Aug. 22, 2018

(65) Prior Publication Data
US 2019/0069049 A1 Feb. 28, 2019

Related U.S. Application Data

(60) Provisional application No. 62/548,484, filed on Aug. 22, 2017.

(51) Int. Cl.
| | |
|---|---|
| *H04Q 1/02* | (2006.01) |
| *H04Q 1/06* | (2006.01) |
| *H04Q 1/14* | (2006.01) |
| *H01Q 1/22* | (2006.01) |
| *H01R 24/64* | (2011.01) |
| *G06K 19/077* | (2006.01) |

(52) U.S. Cl.
CPC ............ *H04Q 1/138* (2013.01); *H04Q 1/064* (2013.01); *H04Q 1/149* (2013.01); *G06K 19/07749* (2013.01); *H01Q 1/2216* (2013.01); *H01R 24/64* (2013.01)

(58) Field of Classification Search
CPC ........ H04Q 1/138; H04Q 1/064; H04Q 1/149; H01Q 1/2216
USPC ....................................................... 340/572.1
See application file for complete search history.

(56) References Cited

U.S. PATENT DOCUMENTS

| | | | | |
|---|---|---|---|---|
| 2010/0098425 A1* | 4/2010 | Kewitsch | ............. | G02B 6/3895 398/116 |
| 2010/0210135 A1* | 8/2010 | German | ................. | H04Q 1/138 439/491 |
| 2012/0068830 A1* | 3/2012 | Caveney | ................. | H04Q 1/138 340/10.2 |
| 2012/0256005 A1* | 10/2012 | Kotyrba | ............... | G02B 6/3895 235/492 |

(Continued)

Primary Examiner — Hirdepal Singh
(74) Attorney, Agent, or Firm — Hugh Mansfield (57) ABSTRACT

A patch cable and system for interconnecting a pair of terminals, each of the terminals comprising a terminal RFID transponder comprising a unique ID, and for use with a cradle comprising a cradle RFID antenna. The patch cable comprises a pair of connectors, one of the connectors at each end of and interconnected by a guided transmission medium, a connector RFID antenna associated with each of the pair of connectors, a cable RFID transponder positioned along the patch cable between the connectors for communicating with the cradle RFID antenna. When the cable RFID transponder is brought into proximity with the cradle RFID antenna, RF signals emitted by the cradle RFID antenna provide power to and communications with the cable RFID transponder for powering the connector RFID antennas and retrieving the unique IDs of the pair of terminals and communicating the unique IDs to the cradle.

19 Claims, 5 Drawing Sheets

(56) References Cited

U.S. PATENT DOCUMENTS

| | | | |
|---|---|---|---|
| 2012/0274452 A1* | 11/2012 | Chamarti | G02B 6/3895 |
| | | | 340/10.5 |
| 2013/0300539 A1* | 11/2013 | Glidden, III | G06K 19/0717 |
| | | | 340/10.1 |
| 2014/0138431 A1* | 5/2014 | Standish | G06K 7/10415 |
| | | | 235/375 |
| 2015/0170483 A1* | 6/2015 | DeCusatis | G06K 7/10158 |
| | | | 340/8.1 |
| 2017/0034597 A1* | 2/2017 | Shih | H04Q 1/136 |
| 2018/0259722 A1* | 9/2018 | Raza | G02B 6/3897 |

\* cited by examiner

US 10,462,540 B2

INTELLIGENT SYSTEM FOR INTERCONNECTING DATA NETWORKING EQUIPMENT

CROSS REFERENCE TO RELATED APPLICATIONS

This Application claims priority under 35 USC § 119(e) of U.S. provisional application Ser. No. 62/548,484. All documents above are incorporated herein in their entirely by reference.

FIELD OF THE INVENTION

The present invention relates to an intelligent system for interconnecting data networking equipment. In particular, the present invention relates to sensing interconnections between ports on network equipment using RFID transponders and relaying information regarding these interconnections to a management system.

BACKGROUND OF THE INVENTION

The prior art discloses systems where RFID transponders are imbedded in network plugs and used to identify a network plug when it is inserted into a receptacle of an item of networking equipment. One drawback of such systems is that the networking equipment must be equipped with a system for powering the RFID transponders and sending identification information to an asset management system. Legacy systems typically are not equipped to power and communicate with the RFID transponders. As result, such legacy systems must typically be replaced.

What is needed therefore, and an object of the present specification, is a system which can provide identifiable interconnections without replacing the networking equipment.

SUMMARY OF THE INVENTION

In order to address the above and other drawbacks there is provided An intelligent system for interconnecting data networking equipment. The system comprises an asset management application attached to a network, a plurality of terminals each configured for receiving a connector, a plurality of terminal electronics each comprising an RFID transponder, each associated with a different one of the plurality of terminals and each comprising a unique ID, a plurality of patch cables each comprising a pair of connectors, one of the connectors at each end of and interconnected by a guided transmission medium, an active plug RFID antenna associated with each of the pair connectors for emitting and receiving RF signals and network electronics for communicating with the server via the network, wherein each of the connectors are connectable with a given one of the terminals such that on connection the associated connector RFID antenna is brought into a communicating distance of the terminal RFID transponder associated with the given terminal. When, for each patch cable, a first connector of a first patch cable is connected to a first terminal and a second connector is connected to a second terminal, RF signals emitted by the connector RFID antennas are able to provide power to and communications with each of the associated terminal RFID transponders for retrieving the unique IDs of the first and second terminals and further wherein the retrieved pair of unique IDs is transmitted by the network electronics via the network to the asset management application.

Additionally there is provided a method for validating a connection between a pair of terminals. The method comprises connecting the terminals with a patch cable, the patch cable comprising a pair of connectors interconnected by a guided transmission medium and a connector RFID antenna associated with each of the pair of connectors, each of the terminals comprising an RFID transponder and a unique RFID wherein one of each of the terminals and each of the connectors comprise a collocated LED, emitting an RF-signal from each of the RFID antennas, receiving the unique RFIDs in response to the emitted RF-signals, comparing the received unique RFIDs to a plurality of RFID pairs stored in a database, and at least one of illuminating the LED in a manner indicating an invalid connection when the received unique RFIDs fail to match one of the stored ID pairs and illuminating the LED in a manner indicating a valid connection when the received unique RFIDs match one of the stored ID pairs.

There is also provided a patch cable for interconnecting a pair of terminals, each of the terminals comprising a terminal RFID transponder comprising a unique ID, and for use with a cradle comprising a cradle RFID antenna. The patch cable comprises a pair of connectors, one of the connectors at each end of and interconnected by a guided transmission medium, a connector RFID antenna associated with each of the pair of connectors, a cable RFID transponder positioned along the patch cable between the connectors for communicating with the cradle RFID antenna. When the cable RFID transponder is brought into proximity with the cradle RFID antenna, RF signals emitted by the cradle RFID antenna provide power to and communications with the cable RFID transponder for powering the connector RFID antennas and retrieving the unique IDs of the pair of terminals and communicating the unique IDs to the cradle.

DETAILED DESCRIPTION OF THE ILLUSTRATIVE EMBODIMENTS

Figure 1:
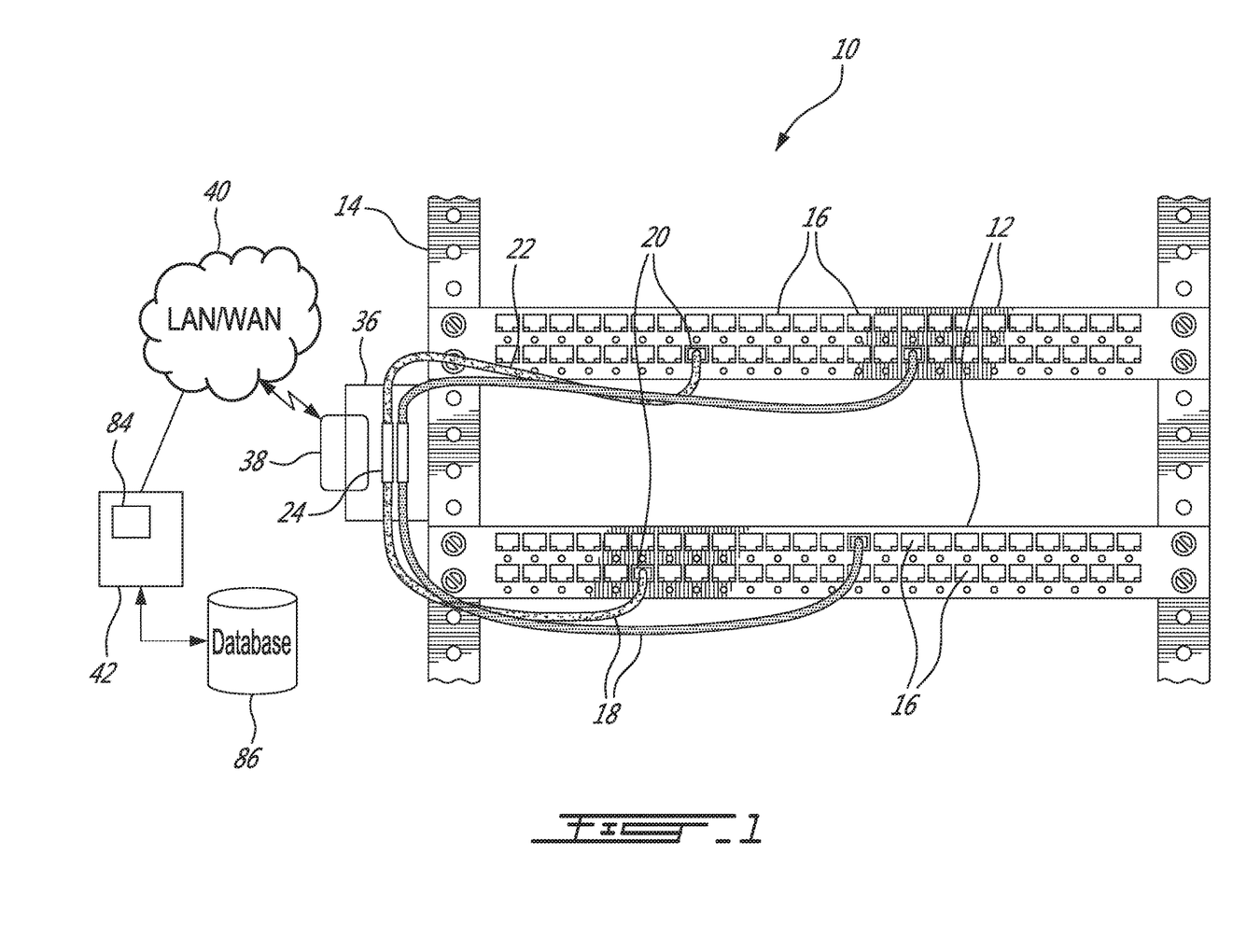
FIG. 1 provides a schematic diagram of an intelligent system for interconnecting data networking equipment in accordance with an illustrative embodiment of the present invention.

Referring now to FIG. 1, an intelligent system for interconnecting data networking equipment, generally referred to using the reference numeral 10, will now be described. The system 10 is illustratively for use in a data centre or the like, comprising a plurality of patch panels 12 and other network equipment such as switches (not shown) mounted in a 19" rack 14. The patch panels 12 comprise a plurality of receptacles 16 interconnected with other receptacles 16 in other patch panels 12 using a patch cable 18.

Figure 2:
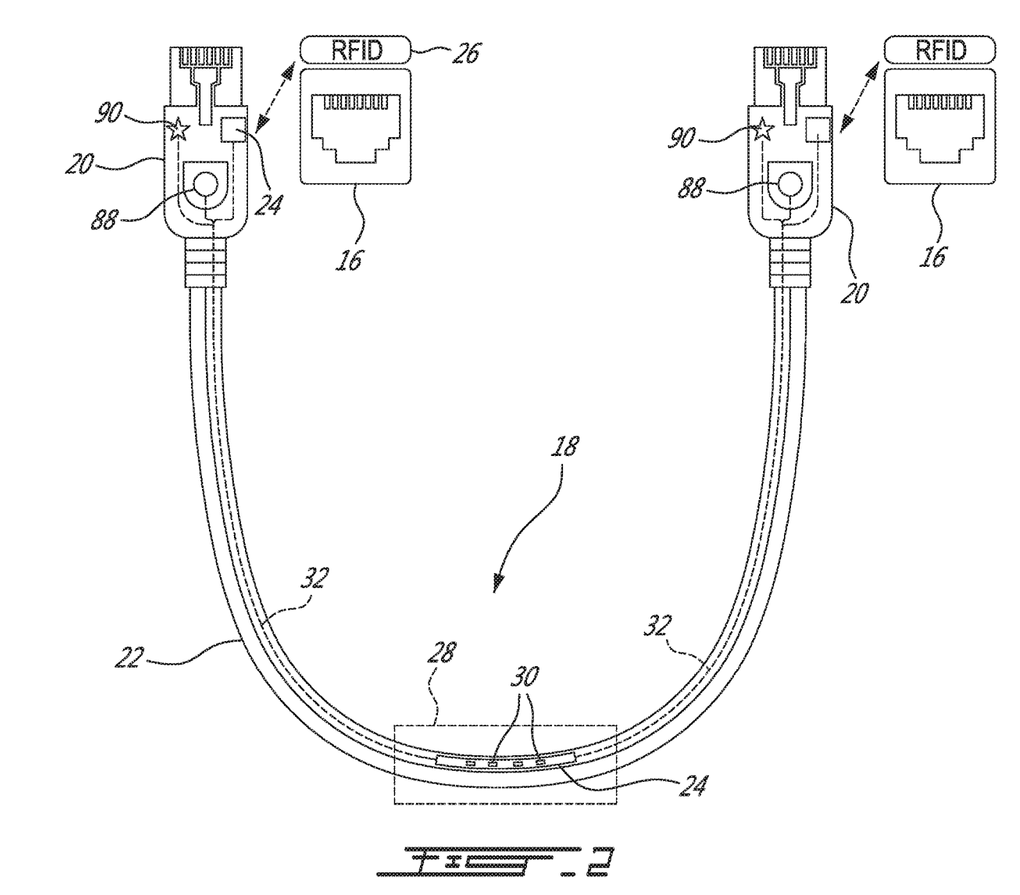
FIG. 2 provides a top plan view of patch cord in accordance with an illustrative embodiment of the present invention.

Referring now to FIG. 2 in addition to FIG. 1, each patch cable 18 comprises pair of connectors 20 interconnected by a guide transmission medium, illustratively a length of cable 22 comprising a fiber optic cable, a plurality of twisted pairs of conductors, a coaxial cable, a twinax cable (all not shown) or the like, and typically of between 1 meters and 10 meters in length. Each plug 20 has associated with it a plug RFID antenna 24. The connectors 20 are configured for connection to a respective terminal 16, each of which has a passive RFID transponder 26 associated with it.

Still referring to FIG. 2, in particular embodiment each connector 20 comprises a network plug and each terminal 16 comprises a receptacle into which the plug 20 is inserted. Insertion of the plugs 20 into the receptacle 16 brings the plug RFID antenna 24 into a communicating distance of the RFID transponder 26, that is proximate enough that the plug RFID antenna 24 and the RFID transponder 26 may communicate. In a first embodiment a middle section 28 of the cable 18 houses cable electronics 30 and is interconnected with each of the plug antennas 24 via a conductor 32 and such that data may be transmitted between the RFID transponder 26 and the cable electronics 30.

Referring back to FIG. 1, in a particular embodiment the cable electronics 30 as discussed above are housed in the middle section 28 of each of the cables 22 which is arranged along a side of the rack 14 and a portion of each cable 22 is received within a cradle 36. As will be discussed in more detail below, provision is made in the cradle 36 for cradle electronics 38 which can relay information between the cable(s) 18 and a local or wide area network (LAN/WAN) 40, and such that data may be communicated between the RFID transponder 26 and a server or the like 42.

Figure 3:
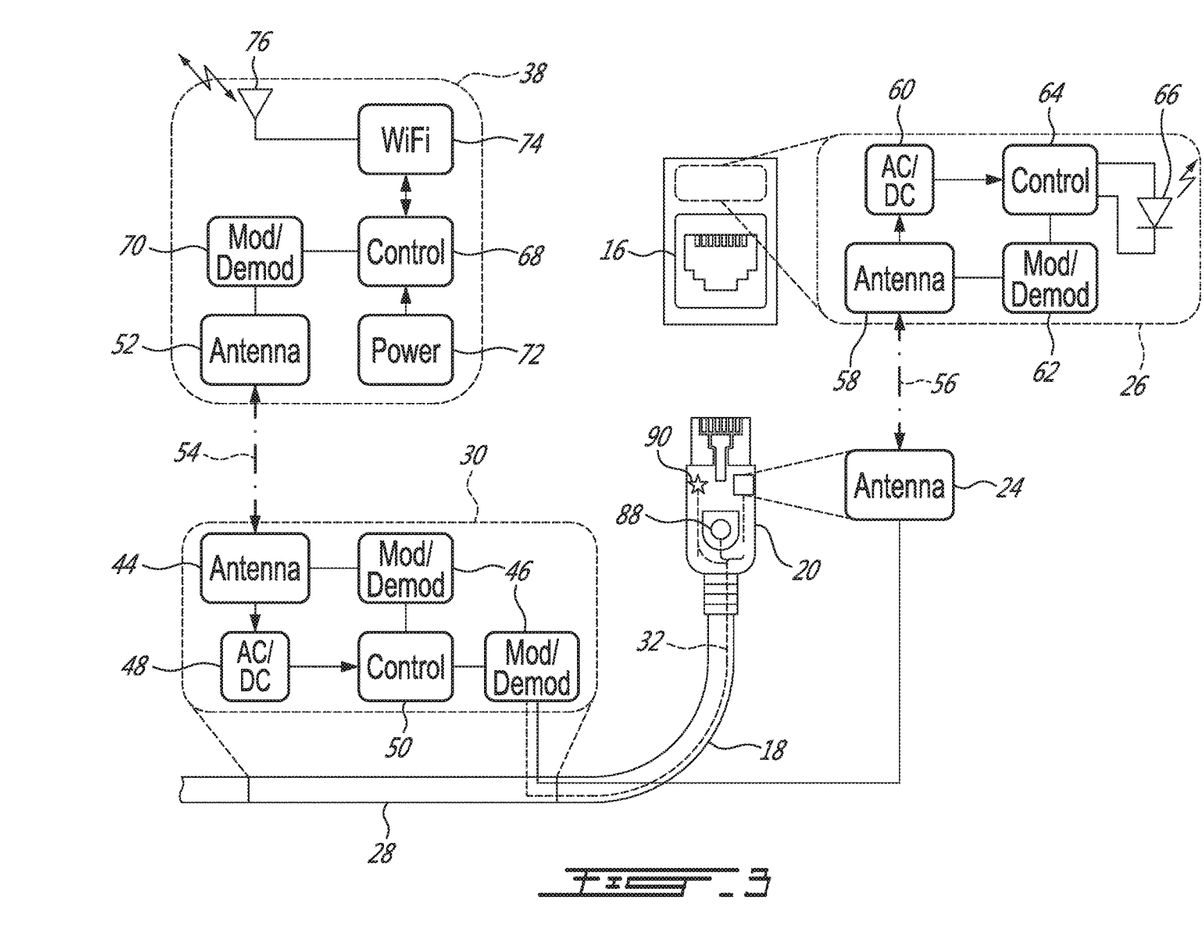
FIG. 3 provides a functional schematic diagram of a patch cord and receptacle in accordance with an illustrative embodiment of the present invention.

Referring now to FIG. 3, as discussed above each cable 18 comprises cable electronics 30. The cable electronics 30 comprise both RFID electronics and network electronics, that is various components including a cable antenna 44, modulator/demodulators 46, AC/DC convertor 48 and control module 50 such that data may be communicated between the RFID transponder 26 and the network via the cradle electronics 38. In a particular embodiment the cable electronics 30 communicate with the cradle electronics 38 using an RFID type connection where a radio frequency (RF) signal emitted by a cradle antenna 52 is used to both generate power via the AC/DC convertor 48 for powering the cable electronics 30 and provide a first communication channel 54. Once powered, the cable electronics 30 may in turn generate an RF signal via the plug antenna 24 which is used to both power and provide a second communication 56 with the RFID transponder 26. In this regard, the RFID transponder will typically comprise components similar to the cable electronics, such as an antenna 58, AC/DC convertor 60, modulator/demodulator 62 and controller 64, but may include additional components, also powered by the RF signal, such as an LED 66, for example to provide visual feedback or the like.

Still referring to FIG. 3, in an alternative embodiment the cable electronics 30 could include and be powered by an independent battery (not shown).

Referring back to FIG. 1 in addition to FIG. 3, in addition to a controller 68 and modulator/demodulator 70, the cradle electronics 38 may illustratively further comprise a power supply 72 as well as well as a WiFi interface 74 including associated WiFi antenna 76. Provision of the WiFi interface 74 enables to the cradle electronics 38 to, as discussed above, relay data between the RFID transponder 26 and a LAN/WAN 40 or the like.

Figure 4A:
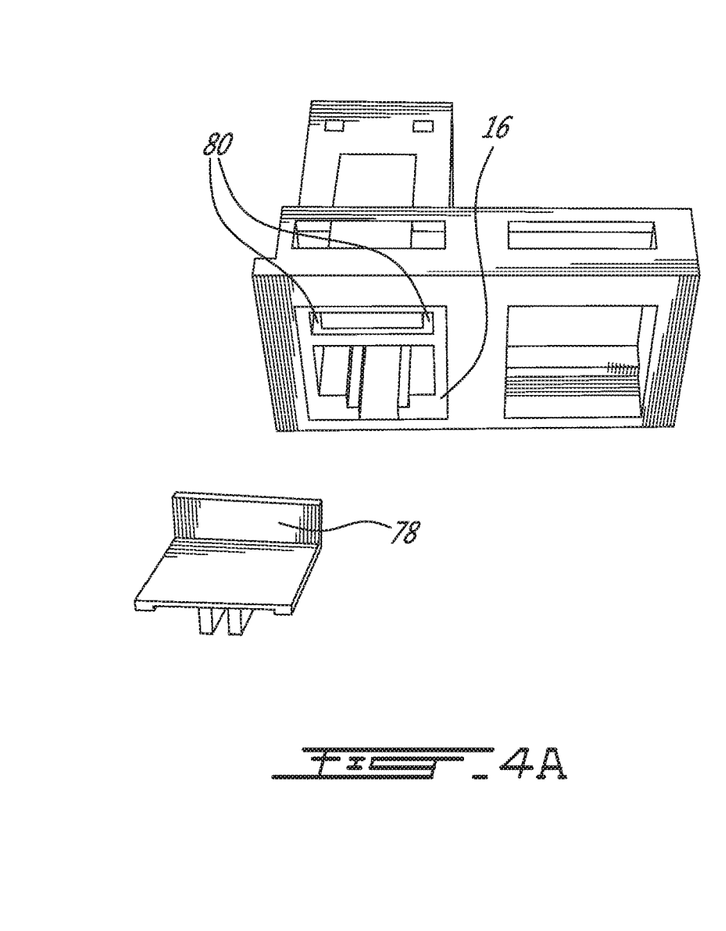
FIGS. 4A and 4B provide retrofittable RFID transponders in accordance with illustrative embodiments of the present invention.
Figure 4B:
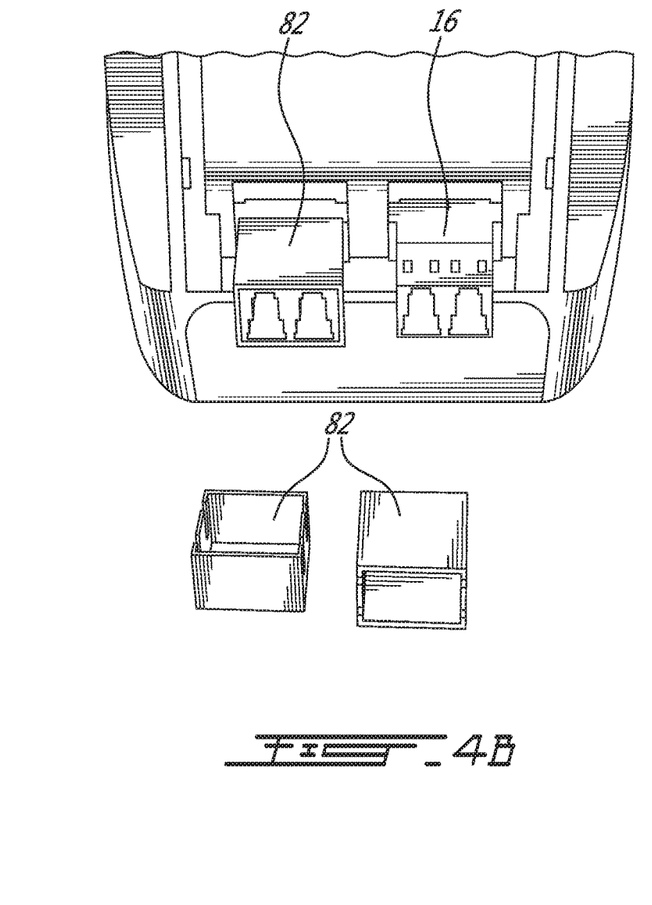

Still referring to FIG. 1, each RFID transponder 26 is provided with a unique RFID which is transmitted during data communications and allowing for identification of the receptacle 16 with which a given RFID transponder 26 is associated. In this regard, in a first embodiment the RFID transponder 26 may be secured to the patch panel 12 adjacent the receptacle 16 using an adhesive or the like. Alternatively, and with reference to FIG. 4A the RFID transponder 26 may be imbedded into a dust cover 78 or the like. In this regard, the dust cover 78 comprises tabs (not shown) which are engaged in slots 80 formed in the receptacle 16, thereby securing the dust cover 78 in place. With reference to FIG. 4B, in an alternative embodiment the RFID transponder 26 may be imbedded in a sleeve 82 which fits snuggly over the receptacle 16.

Still referring to FIG. 1, prior to interconnection, the IDs of the RFID transponders associated with each of the patch panels 12 and receptacles 16 can be stored in a database 84 accessible via the server 42. Following installation of a cable 18 interconnecting RFID ID pairs, the paring of interconnected receptacles 16 can be relayed as a Data Set via the cradle electronics 38 and the LAN/WAN 40 to the server 42 for analysis by the asset management application 84 and eventual use to update the database 86, thereby making provision for automated network discovery and documentation. This can also be carried out automatically from time to time to ensure that a defined connectivity between receptacles 16 is maintained.

Still referring to FIG. 1, in an illustrative embodiment each of the cables may also be encoded with a unique ID and this information also provided to the server 42 for analysis by the asset management application 84 and eventually storage in the database 86. The system as a result allows for real time assessment of asset management including interconnectivity, resource availability, work order management such as tracking and updating of physical network connections, etc.

Referring back to FIGS. 2 and 3, in a particular embodiment the plugs 20 are provided with a button 88 and such that, when the button 88 is depressed, a check of the status of the interconnection between the receptacles 16 is triggered and checked against data held in the database 86. In this regard, pressing the button triggers the transmission of the pair of unique IDs interconnected by the patch cable to the asset management application 84 for comparison against the database. The asset management application 84 illustratively responds with a confirmation/indication that the interconnection of the unique IDs by the patch cable is either valid or invalid. This response can then be used by the cable electronics 30 to control the LEDs. This can be used, for example, to provide visual feedback as to the correctness of an interconnection, for example by causing the LED 66 associated with the receptacle 16 with which the plug 20 is interconnected to illuminate accordingly, for example steady indicating the interconnection is valid or flashing indicating the connection is invalid. Illustratively, this can be carried out at both plugs 22 of a cable 18 to ensure that the interconnection between receptacles 16 is correct. In an alternative embodiment each plug 20 may be equipped with an LED 90. In this regard, the LED 90 can also be used, for example, to provide visual feedback as to the correctness of an interconnection, for example by causing the LED 90 of a plug 20 interconnected with a receptacle 16 to illuminate accordingly, for example steady indicating the interconnection is correct or flashing indicating the connection is incorrect.

Figure 5:
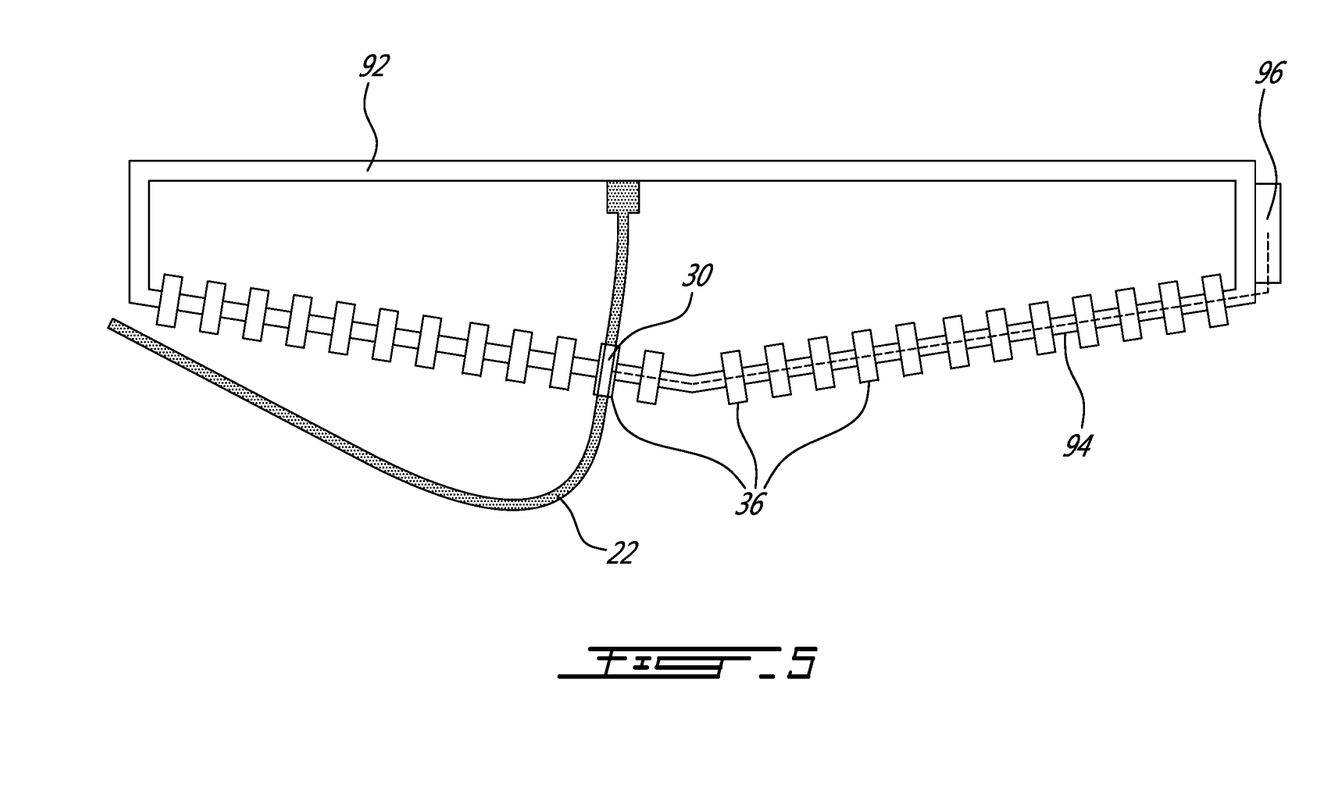
FIG. 5 provides a top plan view of a patch panel and cable management bar assembly including individual cable cradles and in accordance with an illustrative embodiment of the present invention.

Referring to FIG. 5 in addition to FIG. 1, in particular embodiments the cradle(s) 36 may be positioned at other locations about the system 10, and either horizontally or vertically, for example in front of the patch panel 92 or integrated into a cable management bar 94 or the like, with a corresponding adjustment in the location of the cable electronics 30 housed within the cables 22 if required. Additionally, individual cradles as well as the requisite RFID electronics (both not shown) could be provided for each cable 22, for example as part of a cable management bar assembly 94 positioned in front of the patch panel 92, for example, which grips and holds each of the cables 22 individually. In this regard the cable management bar assembly 94 also illustratively includes cradle electronics 38 interconnected with each of the individual cradles 36 in the cable management bar assembly 94 and such that a single network interface 96 is provided for access to the LAN/WAN 40. One advantage of such a configuration is the one to one relationship between each cradle 36 and cable 22 pair.

Although the present invention has been described hereinabove by way of specific embodiments thereof, it can be modified, without departing from the spirit and nature of the subject invention as defined in the appended claims.

The invention claimed is:

1. An intelligent system for interconnecting data networking equipment, comprising:
an asset management application attached to a network;
a plurality of terminals each configured for receiving a connector;
a plurality of terminal electronics each comprising an RFID transponder, each associated with a different one of said plurality of terminals and each comprising a unique ID;
a plurality of patch cables each comprising a pair of connectors, one of said connectors at each end of and interconnected by a guided transmission medium, an active plug RFID antenna associated with each of said pair connectors for emitting and receiving RF signals and network electronics positioned along each said patch cable for communicating with a server via said network, wherein each of said connectors are connectable with a given one of said terminals such that on connection said associated connector RFID antenna is brought into a communicating distance of said terminal RFID transponder associated with said given terminal;
wherein when, for each patch cable, a first connector of a first patch cable is connected to a first terminal and a second connector is connected to a second terminal, RF signals emitted by said connector RFID antennas are able to provide power to and communications with each of said associated terminal RFID transponders for retrieving said unique IDs of said first and second terminals and further wherein said retrieved pair of unique IDs is transmitted by said network electronics via said network to said asset management application.

2. The intelligent system of claim 1, wherein each of said connectors comprises a network plug and each of said terminals comprises a receptacle and further wherein said connected comprises inserting one of said network plugs into a respective one of said receptacles.

3. The intelligent system of claim 1, further comprising a cradle comprising a network interface for communicating with said asset management system via said network and cradle RFID electronics comprising a cradle RFID antenna, wherein said network electronics comprise a cable RFID transponder positioned along said patch cable between said connectors and such that, when said cable RFID transponder is brought into proximity with said cradle RFID antenna, RF signals emitted by said cradle RFID antenna are able to provide power to and communications with said cable RFID transponder for powering said cable RFID electronics and said connectors RFID antennas and retrieving said unique IDs of said first and second terminals.

4. The intelligent system of claim 3, wherein said plurality of terminals are mounted in a patch panel, wherein said patch panel is installable into a standard rack and further wherein said cradle is mountable to said standard rack.

5. The intelligent system of claim 1, wherein said guided transmission medium comprises one of a twisted pair of conductors, an optic fiber, a coaxial cable and a twinax cable.

6. The intelligent system of claim 1, wherein a first of said terminals is in a first patch panel and a second of said terminals is in a second patch panel and further wherein a first connector of an interconnecting one of said plurality of patch cables is connected to said first terminal and a second connector of said interconnecting patch panel cable is connected to said second terminal.

7. The patch cable of claim 1, wherein each of said network plugs further comprises an LED.

8. A method for validating a connection between a pair of terminals comprising:
connecting the terminals with a patch cable, said patch cable comprising a pair of connectors interconnected by a guided transmission medium and a connector RFID antenna associated with each of said pair of connectors, each of the terminals comprising an RFID transponder and a unique RFID wherein one of each of said terminals and each of said connectors comprise a collocated LED;
emitting an RF-signal from each of said RFID antennas;
receiving said unique RFIDs in response to said emitted RF-signals;
comparing said received unique RFIDs to a plurality of RFID pairs stored in a database; and
at least one of illuminating said LED to indicate an invalid connection when said received unique RFIDs fail to match one of said stored ID pairs and illuminating said LED to indicate a valid connection when said received unique RFIDs match one of said stored ID pairs.

9. The method of claim 8, wherein said patch cable further comprises networking electronics for accessing a network, wherein said database comprises part of an asset management application attached to said network and further wherein said comparing comprises transmitting said received unique RFIDs to said asset management application via said network and receiving a conformation that said received unique RFIDs one of match one of said stored ID pairs or fail to match one of said stored ID pairs.

10. The method of claim 8, wherein each of said connectors comprises said collocated LED.

11. The method of claim 8, wherein each of said terminals further comprises RFID electronics comprising said RFID transponder and said collocated LED and further wherein said collocated LED is powered by said RFID electronics.

12. The method of claim 8, wherein at least one of said connectors comprises a button and further wherein said emitting an RF-signal comprises pushing said button to initiate said RF-signal emission.

13. The method of claim 8, wherein each of the terminals comprises a receptacle and each of said connectors comprises a network plug, and further wherein said connecting the terminals comprises inserting each of said network plugs.

14. The method of claim 8, wherein illuminating said LED to indicate an invalid connection comprises illuminating said LED such that it is red and illuminating said LED to indicate a valid connection comprises illuminating said LED such that it is green.

15. The method of claim 8, wherein illuminating said LED to indicate an invalid connection comprises illuminating said LED such that it flashes and illuminating said LED to indicate a valid connection comprises illuminating said LED such that it illuminates steadily.

16. A patch cable for interconnecting a pair of terminals, each of the terminals comprising a terminal RFID transponder comprising a unique ID, and for use with a cradle comprising a cradle RFID antenna, the patch cable comprising:
    a pair of connectors, one of said connectors at each end of and interconnected by a guided transmission medium;
    a connector RFID antenna associated with each of said pair of connectors;
    a cable RFID transponder positioned along said patch cable between said connectors for communicating with the cradle RFID antenna;
    wherein when said cable RFID transponder is brought into proximity with the cradle RFID antenna, RF signals emitted by the cradle RFID antenna provide power to and communications with said cable RFID transponder for powering said connector RFID antennas and retrieving the unique IDs of the pair of terminals and communicating the unique IDs to the cradle.

17. The patch cable of claim 16, wherein each of said connectors comprises a network plug and each of said terminals comprises a receptacle.

18. The patch cable of claim 16, wherein each of said connectors further comprises an LED.

19. The patch cable of claim 16, wherein each of said connectors further comprises a push button for triggering a communication connection between each of said connector RFID antenna and a respective one of the terminal RFID transponders.

* * * * *